US012566732B2

(12) United States Patent
Jagadeesan et al.

(10) Patent No.: US 12,566,732 B2
(45) Date of Patent: Mar. 3, 2026

(54) SYSTEMS AND METHODS FOR LARGE FILE UPLOAD, CONFIGURABLE WITH USER WORKFLOWS

(71) Applicant: WELLS FARGO BANK, N.A., San Francisco, CA (US)

(72) Inventors: Dinesh Jagadeesan, Edison, NJ (US); Kalyan Mukkamala, Concord, NC (US); Deepak Patpatia, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/760,895

(22) Filed: Jul. 1, 2024

(65) Prior Publication Data

US 2026/0003828 A1     Jan. 1, 2026

(51) Int. Cl.
*G06F 16/17* (2019.01)
*G06F 16/182* (2019.01)

(52) U.S. Cl.
CPC .......... *G06F 16/173* (2019.01); *G06F 16/182* (2019.01)

(58) Field of Classification Search
CPC .............................. G06F 16/173; G06F 16/182
See application file for complete search history.

(56) References Cited

U.S. PATENT DOCUMENTS

| | | | |
|---|---|---|---|
| 9,197,702 B2 | 11/2015 | Narayanan | |
| 10,685,136 B1 * | 6/2020 | Hecht ................. | G06F 21/6245 |
| 11,669,310 B2 | 6/2023 | Makhija et al. | |
| 11,856,008 B2 | 12/2023 | Yavo et al. | |
| 2011/0255124 A1 * | 10/2011 | Klassen ................ | G06F 3/1288 |
| | | | 358/1.15 |
| 2014/0289367 A1 | 9/2014 | Kinebuchi et al. | |

(Continued)

FOREIGN PATENT DOCUMENTS

| | | | | |
|---|---|---|---|---|
| CN | 104067281 A * | 9/2014 | ......... | H04L 63/1408 |
| CN | 106375483 A | 2/2017 | | |

(Continued)

OTHER PUBLICATIONS

Gugan, Santhosh , "Optimizing Large File Transfers: Exploring Multi-Part Upload and Chunking Techniques", Medium, Available online at: https://medium.com/@santhoshg1990/optimizing-large-file-transfers-exploring-multi-partupload-and-chunking-techniques-270f6890f7d8, May 20, 2023, 15 pages.

*Primary Examiner* — Angelica Ruiz

(74) *Attorney, Agent, or Firm* — Kilpatrick Townsend & Stockton LLP

(57) ABSTRACT

Systems and methods for large file upload, configurable with user workflows are disclosed. An upload service can receive a data file including metadata associated with a user, then upload the data file to a first database within a distributed computing environment. The upload service may identify an entitlement associated with the user based on the metadata and upload the data file to a second database. The upload service may determine a notification protocol based in part on the entitlement associated with the user, then generate one or more notifications based on the notification protocol. Each action performed by the upload service may be recorded and used to determine an event history of the data file. The upload service can store the event history.

20 Claims, 7 Drawing Sheets

(56)        References Cited

U.S. PATENT DOCUMENTS

| | | | | |
|---|---|---|---|---|
| 2015/0006846 A1* | 1/2015 | Youngworth | ......... | G06F 3/0619 |
| | | | | 711/216 |
| 2020/0334125 A1* | 10/2020 | Degaonkar | ......... | G06F 11/0709 |
| 2021/0099432 A1 | 4/2021 | Chen | | |
| 2023/0156070 A1* | 5/2023 | Chen | .................... | H04N 21/631 |
| | | | | 709/217 |
| 2023/0281604 A1* | 9/2023 | Robell | ................. | G06Q 30/018 |
| 2023/0362133 A1* | 11/2023 | Shetty | ................. | H04L 63/0209 |
| 2024/0061673 A1 | 2/2024 | Ben Zakai et al. | | |

FOREIGN PATENT DOCUMENTS

| | | | | | |
|---|---|---|---|---|---|
| CN | 112100134 A | 12/2020 | | | |
| CN | 112416512 A | 2/2021 | | | |
| CN | 113783832 A | 12/2021 | | | |
| CN | 114615258 A | 6/2022 | | | |
| CN | 115801763 A | 3/2023 | | | |
| CN | 116401225 A | * 7/2023 | ........... | G06F 16/182 |

* cited by examiner

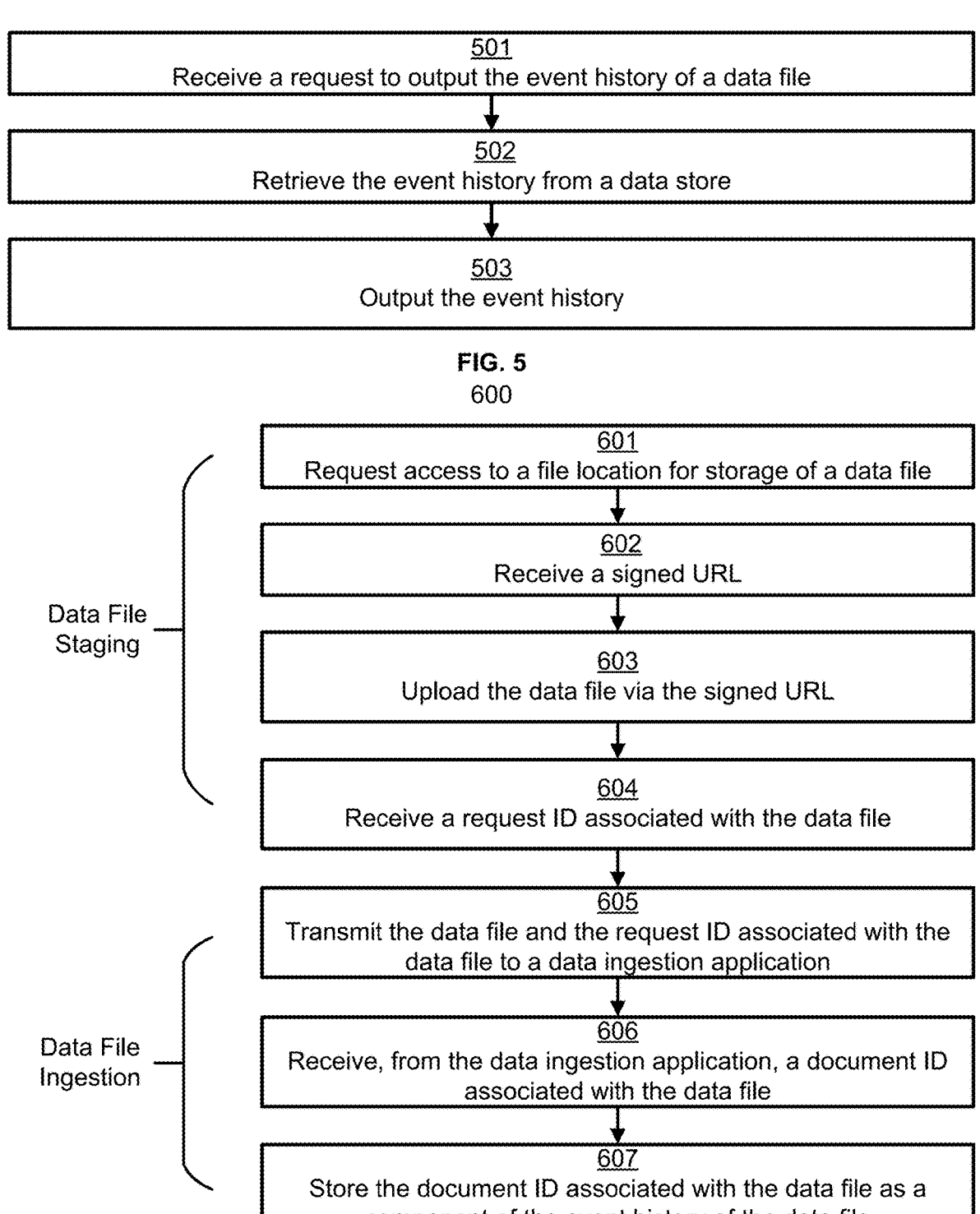

500

<u>501</u>
Receive a request to output the event history of a data file

<u>502</u>
Retrieve the event history from a data store

<u>503</u>
Output the event history

<u>601</u>
Request access to a file location for storage of a data file

<u>602</u>
Receive a signed URL

<u>603</u>
Upload the data file via the signed URL

<u>604</u>
Receive a request ID associated with the data file

Data File Staging

<u>605</u>
Transmit the data file and the request ID associated with the data file to a data ingestion application <u>606</u>
Receive, from the data ingestion application, a document ID associated with the data file <u>607</u>
Store the document ID associated with the data file as a component of the event history of the data file Data File Ingestion

FIG. 6

SYSTEMS AND METHODS FOR LARGE FILE UPLOAD, CONFIGURABLE WITH USER WORKFLOWS

FIELD OF TECHNOLOGY

The present disclosure generally relates to systems and methods for file upload, and more particularly to systems and methods for highly performant and highly reliable large file upload that is configurable with user workflows.

BACKGROUND

Existing application programming interfaces ("API") integrated with document management systems are limited by file upload size. For instance, typical APIs for file upload can only support up to 10 MB datafiles. Existing API integration methods may have various fault points leading to file upload failures downstream. Additionally, the process of uploading documents often depends on the user uploading the document. Traditional hard-coding means of planning the upload process based on the user is labor intensive and requires continuous reintegration and recoding if new users are added.

SUMMARY

According to certain embodiments, a method for large file upload, configurable with user workflows comprises: receiving a data file comprising metadata associated with a user; uploading the data file to a first database within a distributed computing environment; identifying an entitlement associated with the user based in part on the metadata; uploading the data file to a second database; determining, based in part on the entitlement associated with the user, a notification protocol; generating one or more notifications based on the notification protocol; determining an event history of the data file; and storing the event history.

According to certain embodiments, a system for large file upload, configurable with user workflows comprises one or more processors configured to: receive a data file comprising metadata associated with a user; upload the data file to a first database within a distributed computing environment; identify an entitlement associated with the user based in part on the metadata; upload the data file to a second database; determine, based in part on the entitlement associated with the user, a notification protocol; generate one or more notifications based on the notification protocol; determine an event history of the data file; and store the event history.

According to another embodiment, a non-transitory computer readable medium may comprise program code, which when executed by one or more processers, causes the one or more processors to perform operations including: receive a data file comprising metadata associated with a user; upload the data file to a first database within a distributed computing environment; identify an entitlement associated with the user based in part on the metadata; upload the data file to a second database; determine, based in part on the entitlement associated with the user, a notification protocol; generate one or more notifications based on the notification protocol; determine an event history of the data file; and store the event history.

These illustrative examples are mentioned not to limit or define the limits of the present subject matter, but to provide an example to aid understanding thereof. Illustrative examples are discussed in the Detailed Description, and further description is provided there. Advantages offered by various examples may be further understood by examining this specification and/or by practicing one or more examples of the claimed subject matter.

BRIEF DESCRIPTION OF THE DRAWINGS

A full and enabling disclosure is set forth more particularly in the remainder of the specification. The specification makes reference to the following appended figures.

FIG. 5 illustrates a flow chart for a method of for a system for file management and monitoring according to one embodiment.

FIG. 6 illustrates a flow chart for a method of for a system for file upload, management, and monitoring according to one embodiment.

DETAILED DESCRIPTION

Figure 1:
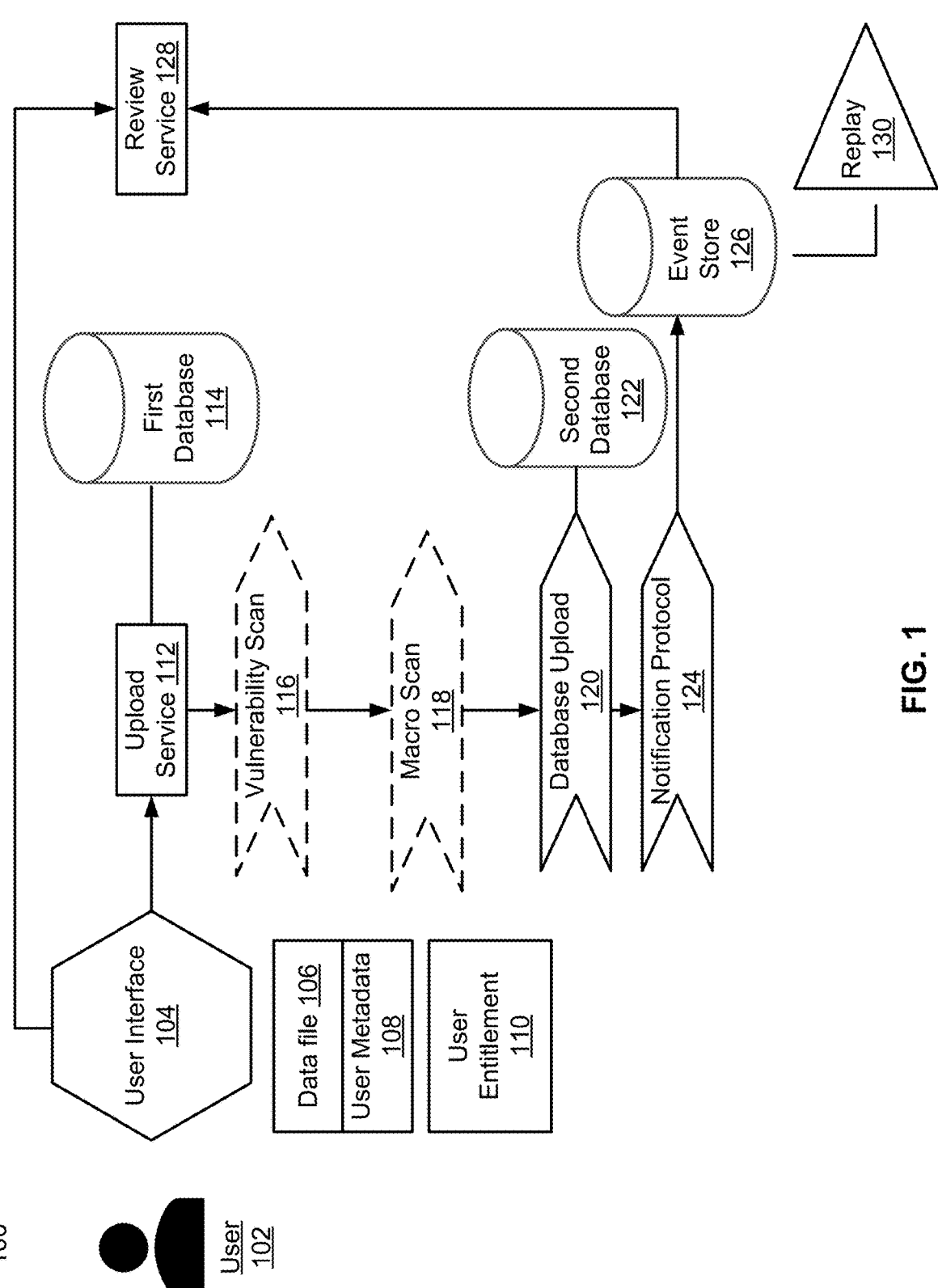
FIG. 1 illustrates a block diagram for a system for file upload, management, and monitoring according to one embodiment.

Reference will now be made in detail to various and alternative illustrative examples and to the accompanying drawings. Each example is provided by way of explanation, and not as a limitation. It will be apparent to those skilled in the art that modifications and variations can be made. For instance, features illustrated or described as part of one example may be used on another example to yield a still further example. Thus, it is intended that this disclosure include modifications and variations as come within the scope of the appended claims and their equivalents.

Illustrative Embodiment of a System for File Upload Management

In one illustrative embodiment, a system for file upload management includes an application for receiving user requests to upload large data files, for instance, exceeding 100 MB, to a data management system. The application may be part of a larger enterprise application infrastructure or data management system. The application may provide a user interface to allow various users with different access permissions or entitlements to upload files to a file management database. In one example, the users can include a financial advisor, a client assistant or support member, or a client themself. Depending on how the file upload management system is configured, the file upload management system can process requests differently based on the type of user.

Once a user inputs a request to upload a data file through a user interface of the file upload management system, the file upload management system can evaluate the size of the data file and chunk the data file into smaller size files if the data file exceeds a threshold size. The threshold size may be set in relation to constraints of an API upload manager such as APIGEE. For instance, the API upload manager may be constrained to file upload sizes of 10 MB, but a user may request to upload a data file that is 100 MB. The upload management system may then chunk the data file into 10 chunks of 10 MB, or as another example, 11 chunks, each capped at 9 MB. Any number of data chunks may be generated depending on factors including the data file size, the constraints of the API upload application, and the bandwidth of the nodes and first database such as a cloud-based file management system.

The chunked data files may be passed in parallel through one or more nodes in a distributed computing environment to the cloud-based file management system. The nodes can be environment dependent and may for instance be Spring Boot PCF nodes, JavaScript Nodes, Python Nodes, or any other serverless computing node. The cloud-based file management system, for instance MongoDB, may then receive the chunked data files and process the chunked data in sequential order to reform the uploaded data file.

Alternatively, the data file may be streamed to one or more nodes in the distributed computing environment and then to the cloud-based file management system. In either of the chunking or streaming examples the user can bypass file-size upload constraints imposed by API upload managers and thereby upload large data files.

Illustrative Embodiment of a System for File Upload Management and

File upload procedures may also be user dependent. Different upload procedures may be required depending on a user's defined entitlement. For instance, a financial advisor uploading a file may require a file upload service to reconfigure the sequence of data analysis steps such as a given notification protocol. What notifications are sent, and to who, may depend on the role or user entitlement of the user uploading the file. A financial advisor uploading a file may cause an upload service to call a specific notification protocol configuration which causes notifications to be sent to a client assistant, a client, or another user the upload service network. Similarly, different notification protocols may be triggered by the upload service when the user submitting the upload request is a client assistant or client.

The upload service may be programmed through applied configuration over coding techniques. With such techniques the upload service can adaptably respond to new users entering the upload service system, and at increasing scale. The configuration over coding techniques may be applied in assigned different roles over who can use the upload service, what notification protocol is triggered, and what checks are performed to validate whether a file is uploaded. Then, if new user roles or user entitlements are added, they may be added at scale and without requiring further coding by a back end developer.

Large data file uploads may also require validation and event recording to proper file uploads have been performed. As will be discussed further throughout the various embodiments, large file upload may constitute a variety of steps, for instance including the notification protocols discussed above, but also other steps such as virus scanning, macro detection, upload staging and ingestion, among other uploading steps. At various stages of the upload process, the large data file upload can fail. For instance, a virus may be found in the file and the process terminated. Alternatively, HTTP errors such as 400 or 403 errors may indicate that a particular upload stage has failed. Each step in the upload process may need to be tracked and recorded, whether for regulatory reasons, infrastructural reasons, process improvement reasons, or any other justification.

Thus, the upload service can append event history metadata as a data file passes through each step in the larger file upload process. The event history metadata may then store a log of information indicating each stage of file upload applied to a data file, including whether a data file failed to upload and if so at which stage of the file upload process the data file failed. The event history metadata may be stored in an event store for future retrieval. For instance, a user may call on a user interface to replay the event history of a given file upload. The event store may then provide the user the event history for any given file upload, indicating whether the file was successfully uploaded and the stages of the file upload such as the notification protocol used during the file upload.

Example System for File Upload

FIG. 1 illustrates a block diagram for a system 100 for file upload, management, and monitoring according to one embodiment. The system 100 includes a user interface 104 communicatively coupled to an upload service 112, first database 114, second database 122, and event store 126.

The user interface 104 can provide a means for a user 102 to interact with the upload service 112 as a software application. The user interface can include a display device for display to a user 102 and can receive inputs and requests from the user 102. The inputs received by the user interface can include as a request to upload a data file 106 to one or more databases. The user 102 may include a variety of classified users such as financial advisers, client assistants, clients themselves, or any other class of user. Generally, the user 102 will submit a request to upload a data file, particularly of a large size such as a data file exceeding 100 MB, to one or more databases.

When a user submits a request to upload a data file 106, the data file 106 may include user metadata 108 identifying the user 102. For instance, the user interface 104 may be accessible only by specified user accounts requiring password entry or other means of user authentication. Then, when a user 102 accesses a user account on the user interface 104 and submits a request to upload a data file 106, the user interface 104 and upload service 112 can append to the data file 106 user metadata 108 such as an identifier of the class of user making the request.

The user metadata 108 may be associated with a user entitlement 110. The user entitlement 110 may be an identifier generated or received by the upload service 112 that causes the upload service 112 to configure a specific procedure for uploading the data file 106 to one or more of the first database 114 or the second database 122. For instance, different notification protocols 124 may be triggered by the upload service 112 in response to a specified user entitlement 110 where the user entitlement 110 is based on the user metadata 108.

The upload service 112 can be a software program with configuration over coding protocols that renders the upload service responsive to user entitlements 110. For instance, the upload service can adjust the upload procedure to the first database 114 and the second database 122 in response to user entitlement 110, data file size, and other metadata associated with the data file 106. The upload service 112 can also be configured with a program to upload data files to a first database 114. For instance, the upload service 112 program can include an API management software such as APIGEE which causes the data file to be uploaded to the first database 114. The upload service 112 program may generally be sized constrained. For instance, the upload service 112 program can be limited to uploading file sizes not exceeding 1 MB, 5 MB, or any other specified data size.

The first database 114 can include a cloud-based database or distributed computing environment. The first database 114 can also be a document oriented database or relational database capable of receiving JavaScript Open Notation ("JSON") files, Structured Query Language ("SQL") or other format of data. Examples of the first database 114 can include MongoDB, Redis, CouchDB, or any other document oriented or relational database.

Figures 3A, 3B:
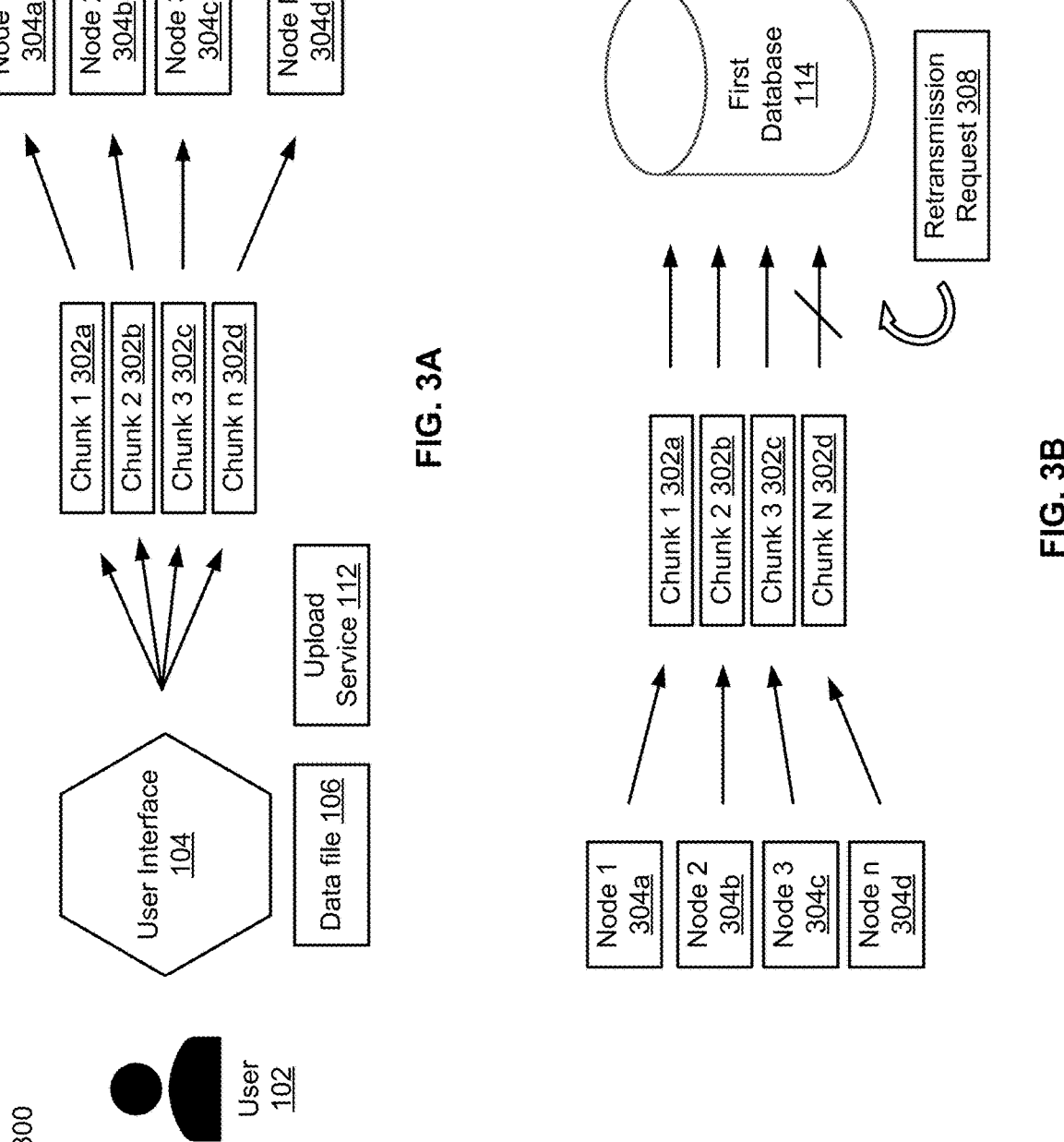
FIG. 3A-3C illustrate a block diagram for a system for uploading large data files to a database according to one embodiment.
Figure 3C:
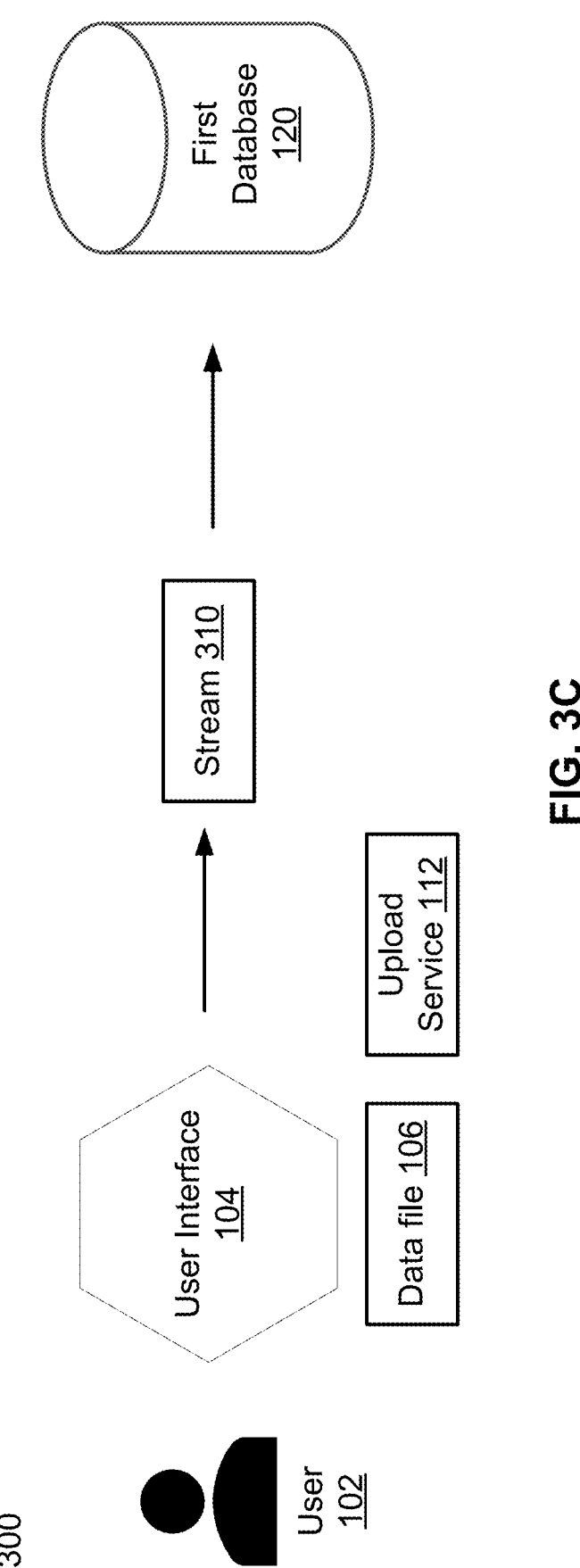

As above, the upload service 112 can configure data file 106 upload procedures based on metadata of the data file such as the data file size, or user metadata. FIGS. 3A-3C discuss file upload procedures to specific to uploads to the first database 114 based on file size, while discussed below are specific upload procedures based on user entitlement.

After the file is uploaded to the first database 114, discussed further with respect to FIGS. 3A-3C, the data file 106 may be uploaded from the first database 114 to a second database 122 according to a procedure specified by the upload service 112. The second database 122 can be a database separate from the first database 114. The second database 122 can include an image content and document management platform intended to be the final storage destination of the data file 106. For instance, the second database 122 can include a designated repository for all files uploaded regardless of the user 102 and user entitlement 110.

As part of the upload procedure from the first database 114 to the second database 122, the data file 106 can undergo a variety of events as specified by the upload service 112. For instance, the file can undergo a vulnerability scan 116 and/or a macro scan 118. The vulnerability scan 116 can include comparing the data file 106 to one or more vulnerabilities or attack signatures as stored in a vulnerability database. The macro scan 118 may similarly include comparing the data file 106 to one or more macros stored in a macro database. If a vulnerability is found in the data file 106, the upload service 112 can terminate the upload process, or alternatively can notify one or more users 102 based on the user entitlement 110. Similarly, if a macro is detected in the data file 106 during the macro scan 118, the upload service may terminate the upload process, may remove the macro from the data file 106, or perform another procedure such as notifying one or more users of the identified macro. The vulnerability scan 116 and the macro scan 118 can be executed by a call from the upload service 112 to the upload service program such as APIGEE.

If no viruses and no macros are detected, the upload service 112 can execute the database upload process to upload the data file 106 to the second database. Specific steps of the second database upload 120 will be described further with respect to FIG. 6, but generally may be described as including staging and ingestion steps, wherein the staging step involves ensuring proper upload of the data file 106 to the second database 122, and the ingestion step includes receiving approval from a user to deploy the data file 106 into the second database 122 for more permanent storage.

Following the second database upload 120 to the second database 122, a notification protocol 124 may be selected by the upload service 112 based on the user entitlement 110 associated with the user 102. The notification protocol 124 can include transmitting a notification that the data file 106 was successfully uploaded to a variety of devices and users.

For instance, if the data file upload was initiated by a financial advisor user, the notification protocol 124 may trigger notifications to be sent to user devices of the client user, the client support user, a regulatory user. Uploads by the client support user may trigger a notification protocol 124 that transmits a notification only to the financial advisor user, but not the client user or the regulatory user.

At each event of the file upload, such as the upload to the first database 114, the vulnerability scan 116, the macro scan 118, the second database upload 120, each notification of the selected notification protocol 124, and any other action performed by the upload service 112, the upload service 112 can append metadata to the data file 106 indicating what event was performed on the data file 106, and the outcome of each event. For instance, if a vulnerability is detected during the vulnerability scan 116, the upload service 112 can append metadata indicating that a vulnerability scan 116 was performed on the data file 106, that a vulnerability was detected and the name of the vulnerability, and further that the upload was then terminated. The metadata can then be stored in an event store 126 for future reference. For instance, for each data file 106 that was requested to be uploaded to the second database 122, the event store can record a log, based on the event metadata, of what events were applied to the data file 106. In some examples, the event store 126 may be stored in a third database, separate from the first database and the second database. The third database for the event store 126 can include a distributed computing platform such as Apache Kafka or RedPanda. The event store 126 may be stored as a third database with read-only permissions. In decoupling the databases based off permissions, such as read-only permissions for the event store 126, and write permissions for the second database, the performance metrics such as latency and load capacity of each database can be improved.

The event store 126 may be communicatively coupled to a review service 128, where the review service 128 may be displayed to a user 102 through the user interface 104. The review service may allow a user to trigger a replay 130 of each event of a give data file 106 upload request. For instance, a user 102 may identify that a given data file was not uploaded to the second database 122. Using the review service 128, the user 102 can replay 130 the event history of the data file upload request which for instance can indicate that a vulnerability scan 116 was performed on the data file 106 indicating no vulnerabilities, but that a subsequent macro scan 118 identified a macro within the data file 106 and that the data file upload was then terminated.

The replay 130 called by the review service 128 may allow for a user 102 to review the sequence and outcome of each event applied to a data file 106. The replay provides advantages to the user 102 given that the upload service 112 may modify the events and protocols applied to each data file upload depending on a variety of factors including the data file size and user entitlement 110. Because the upload service 112 can otherwise automate the specific procedures of uploading the data file 106, the review service 128 replay feature 130 can provide a safety and analytics tool which may additionally be necessary for regulatory compliance for a given industry in which the upload service 112 was to be deployed.

Example Method for File Upload Management

Figure 2:
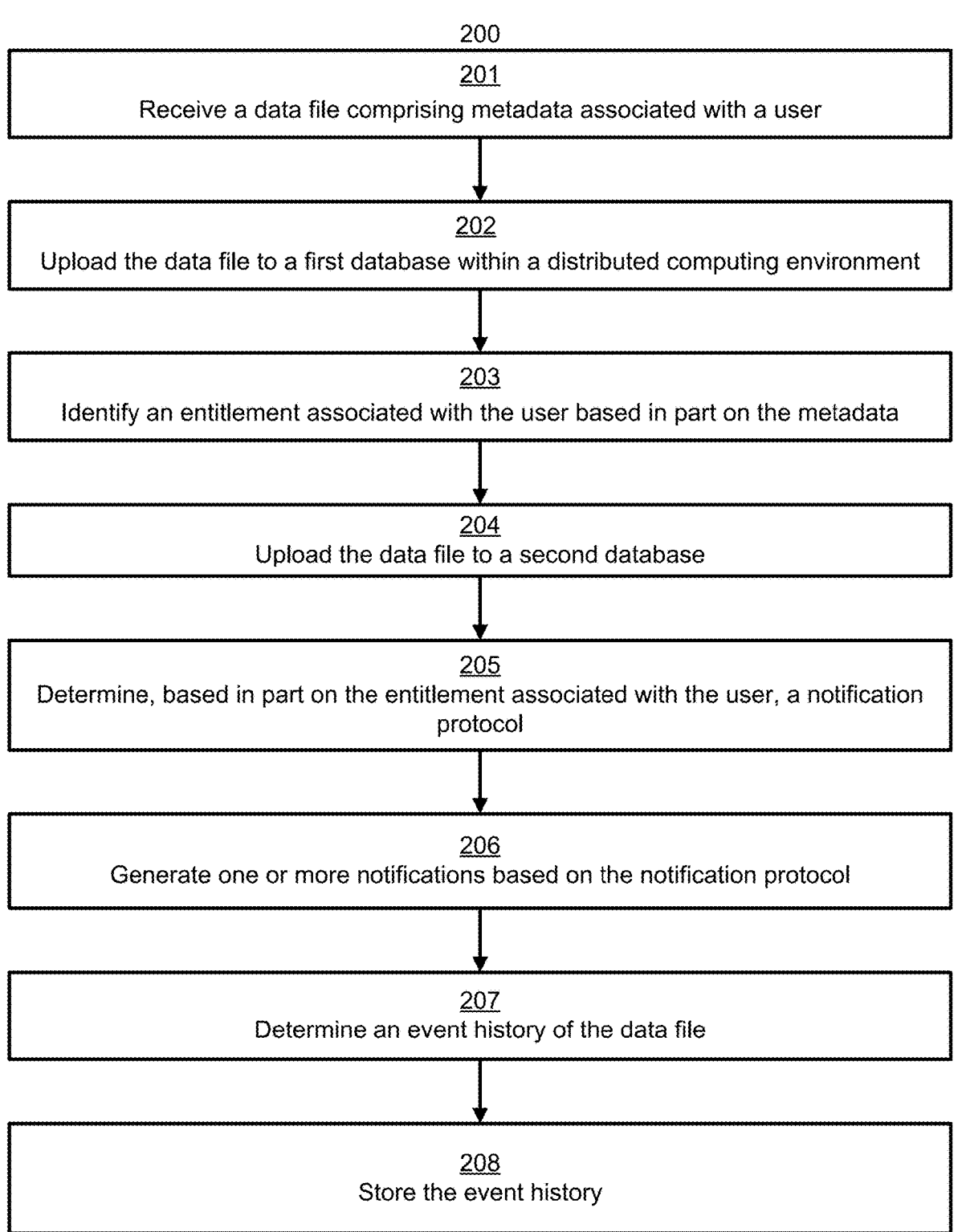
FIG. 2 illustrates a flow chart for a method of for a system for file upload, management, and monitoring according to one embodiment.

FIG. 2 illustrates a flow chart for a method 200 of for a system for file upload, management. Other examples may include more operations, fewer operations, different operations, or a different order of the operations shown in FIG. 2. The operations of FIG. 2 will now be described below with reference to the components of FIG. 1.

At step 201, the upload service 112 receives a data file 106 comprising metadata associated with a user 102. The data file 106 can in any data format such as JSON, or SQL, or can be an image file for deployment in a distributed computing environment. Generally, the data file 106 can be of a size exceeding the upload capabilities of a traditional API management program capable of uploading smaller data files. The user metadata 108 can include data related to the file size, the upload location, and user metadata 108. The user metadata 108 can indicate the user 102 initiating the upload request and can identify a user entitlement 110 associated with the user.

At step 202, the upload service uploads the data file 106 to a first database 114 within a distributed computing environment. Uploading the data file 106 may include the operations described with respect to FIGS. 3A-3C wherein the data file 106 may be chunked into smaller file sizes capable of transmission over a file upload program. Alternatively, the data file 106 can be streamed to the first database 114.

At step 203, the upload service 112 identifies an entitlement 110 associated with the user based in part on the metadata. For instance, the user metadata 108 contained within the metadata may indicate that the user 102 is a financial advisor, a client analyst, or a client.

At step 204, the upload service 112 uploads the data file to a second database 122. The upload to the second database can be based on the data file metadata such as the user metadata 108 and can involve a series of individual steps including file staging and ingestion, as further described with respect to FIG. 6.

At step 205, the upload service 112 determines, based in part on the entitlement 110 associated with the user 102, a notification protocol 124. The notification protocol 124 may thus vary based on the user entitlement 110. The upload service 112 may be configured based on a configuration-over-coding approach such that new user entitlements 110 may be added and associated notification protocols 124 may be modified without having to adjust other aspects of the file upload procedure.

At step 206, the upload service 112 generates one or more notifications based on the notification protocol. Each notification can be sent to a different device and/or user. One notification protocol may only require a single notification sent to a user, while another notification protocol may require transmission of notifications to several users.

At step 207, the upload service 112 determines an event history of the data file. The event history may be tracked at each event and step performed by the upload service 112 before, during, and after the data file 106 being uploaded to the second database 122. The upload service 112 may determine the event history by appending metadata to the data file 106 in response to each event performed on the data file 106 such as the vulnerability scan 116, macro scan 118, or individual steps of the second database upload 120 or specific notification protocol 124.

At step 208, the upload service 112 stores the event history. The upload service 112 may store the event history in an event store 126. The event store 126 may be part of the same database as the first database 114 or second database 122 or may be a separately stored database. The event store 126 may be accessible by a user 102 through a review service 128

Example Method for Ensuring Secure File Upload

FIG. 3A-3C illustrate a block diagram for a system 300 for uploading data files to a database according to one embodiment.

FIG. 3A shows a process for chunking a data file 106 into various chunks 302a-302d which may then be transmitted through one or more nodes 304a-304d. An upload service 112 may receive a request from a user 102 received through a user interface 104 to upload a data file 106 to a first database 114. The data file 106 have a file size exceeding the constraints of an upload service 112 program otherwise capable of uploading data files to the first database 114.

In response, the upload service can detect the file size of the data file 106 as exceeding an upload threshold size, and in response, divide the data into two or more data chunks 302a-302d. For instance, the upload service 112 may split the data file 106 into data chunks 302a-302d each with an individual cap limit, for instance 9 MB. While four data chunks 302a-302d are shown, it is to be appreciated that any number of chunks greater than one may be generated to divide the data file 106 for transmission. Chunking the data may involve dividing the data file 106 into sequential bytes.

Each of the data chunks 302a-302d may be sent in parallel over one or more nodes 304a-304d. Nodes 304a-304d can be any type of node of a distributed computing environment. For instance, Nodes 304a-304d can be Spring Boot PCF nodes, JavaScript nodes, Golang Nodes, or any other type of nodes. While each of data chunks 302a-302d is shown being sent to a different node, each chunk may be sent to any given node independent of the path of the other chunks. For instance, data chunk 1 302a and data chunk 2 302b may be transmitted via node 1 304a, while data chunk 3 302c is sent over node 3 304c. Any combination of paths may be used to transmit data chunks 302a-302d over nodes 304a-304d. Additionally, the data chunks 302a-302d may be sent in batches where the each include one or more of the data chunks 302a-302d. Scheduled batch transmission of the data chunks 302a-302d may be tuned to prevent overload of the distributed server including nodes 304a-304d distributing the data chunks 302a-302d to the first database FIG. 3B shows a process for reparsing the two or more data chunks 302a-302d received from one or more nodes 304a-304d back into data file 106 to be stored in the first database 114. The first database 114 can receive the two or more data chunks 302a-302d from the one or more nodes 304a-304d. Because the data chunks 302a-302d may be sent in parallel, the data chunks 302a-302d may be received out of order. The upload service 112, using the sequential chunking of the data, can reparse the data chunks 302a-302d into the ordered arrangement of the original data file 106.

In some examples the two or more data chunks 302a-302d received from one or more nodes 304a-304d are further stored in a chunk store of the first database 114. For instance, the first database 114 may include a chunk store such as GridFS, wherein each data chunk is stored and saved as a separate data file. The separate data files may then be arranged, by the upload service 112 or by the first database 114 in sequential order and repackaged to reform the data file 106.

In some instances, one or more of the data chunks 302a-302d may fail in transmission to the first database 114. For instance, a given data chunk N 302d can fail in transmission to a node N 304d, or in transmission from node N 304d to the first database 114. Node transmission failure may materialize as an HTTP 400 or 403 error indicating the chunk was not received at the first database 114. Each message such as an HTTP 400 or 403 error can be cataloged as metadata and stored in the event history of the data file. In some examples, the node transmission failure may be sent from the first database 114 back to the upload service 112 in addition to a retransmission request 308. The retransmission request may indicate to the UI that a particular chunk 302*d* was not received at the first database 114. In response to the retransmission request 308, the upload service 112 may resend the specified chunk 302*d* back over one of nodes 304*a*-304*d* back to the first database 114. As part of the retransmission request 308 response, the upload service 112 may resend the specified chunk 302*d* with additional HTTP requests including a HTTP 202 response indicating that the upload of the specified data chunk 302*d* is still in progress, which may indicate to the first database 114 that the specified data chunk 302*d* is still missing from the larger data file 106.

FIG. 3C shows an alternative process for uploading the data file 105 to the first database 114. In the example of FIG. 3C, the data file 106 may be uploaded to the first database through stream 310. The stream 310 may be continuous and can be performed via a streaming API.

Example Method for Validating Secure File Upload

Figure 4:
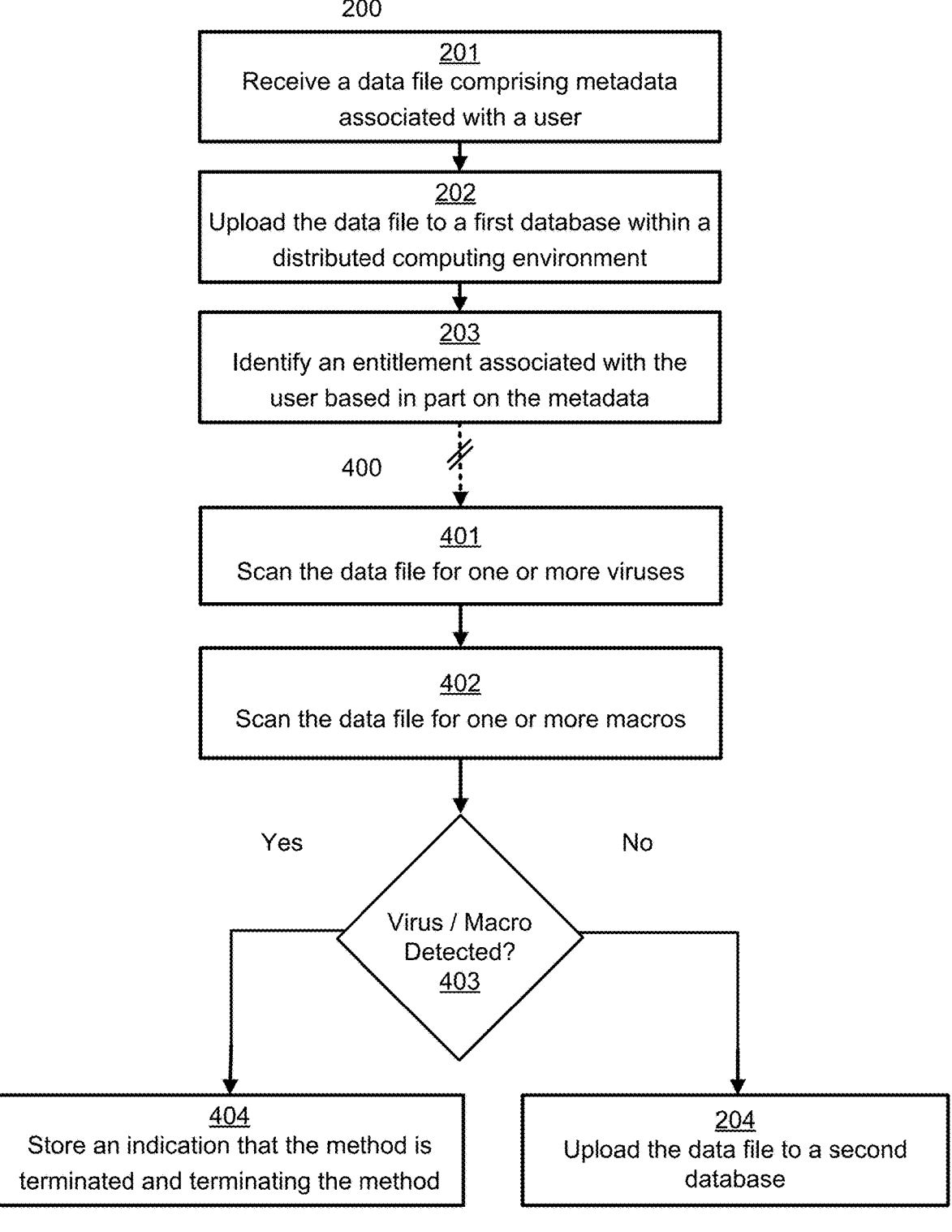
FIG. 4 illustrates a flow chart for a method of secure file upload, management, and monitoring according to another embodiment.

FIG. 4 illustrates a flow chart for a method 400 of secure file upload, management, and monitoring according to another embodiment. Other examples may include more operations, fewer operations, different operations, or a different order of the operations shown in FIG. 4. For instance, the macro scan step 402 may be performed prior to the vulnerability scan step 401 according to some examples. The operations of FIG. 4 will now be described below with reference to the components of FIG. 1 and operations of FIG. 2.

In the example of FIG. 4, the method 400 is shown including portions of method 200, including steps 201-203 and 204. Steps 201-203 and 204 are shown to indicate that the method 400 may be used in conjunction with steps recited in FIG. 2 with respect to method 200. Thus, the steps of receiving a data file 201, uploading the data file to a first database 202, and identifying an entitlement associated with the user based in part on the metadata 203 described with respect to FIG. 2, may similarly be applied with respect to the method 400.

At step 401, the upload service 112 may scan the data file received at step 201 for one or more viruses. Scanning the data file 106 for one or more viruses may comprise performing a vulnerability scan 116 wherein the data file is compared against known vulnerabilities stored in a vulnerability database. The vulnerability database may for instance may be integrated within the first database 114. The vulnerability database may for instance be a common vulnerability and exposures ("CVE") database and may be integrated with the first database 114 through an API. In some examples, the vulnerability scan 116 performed at step 401 may be performed on identified subcomponents of the data file 106, for instance if the data file 106 contains one or more software components or packages.

At step 402, the upload service 112 may scan the data file 106 for one or more macros. Scanning the data file 106 for one or more macros may comprise performing a macro scan 118 wherein the data file 105 is compared against a macro database. The macro database may be integrated within the first database 114 or integrated through an API. The macro scan 118 performed at step 402 may be applied to the data file 106 as a whole or may be applied to subcomponents of the data file 106, for instance if the data file 106 contains one or more software components or packages.

At step 403, the upload service 112 determines a following step 404 or 204 based on whether a virus or macro was detected during steps 401 and 402. If either a virus or macro was detected during steps 401 and 402, the upload service 112 may proceed to step 404. Otherwise, the upload service may proceed to step 204 and continue with the method described with respect to FIG. 2. In some examples, the upload service 112 may proceed to step 404 prior to the upload service performing steps 401 or 402. For instance, if a virus is detected during step 401, the upload service 112 may proceed to step 404 without performing step 402 where the data file 106 would be scanned for one or more macros. If step 402 is performed prior to step 401, and a macro is detected, the upload service 112 may proceed to step 404 without performing the virus scan at step 401.

At step 404, the upload service 112 may store an indication that the method 200 was terminated and terminate the method 200. Terminating the method 200 would mean that the data file 106 was not uploaded to the second database 122 per step 204. Instead, the detected virus or macro would be prevented from being introduced into the second database 122 to maintain the security of the second database 122. However, for the purposes of data tracking, the upload service 112 may still record an indication that the method 200 was terminated. The indication may indicate that the data file 106 was not uploaded to the second database 122 as the upload service 112 detected a virus during the vulnerability scan 116, or macro during the macro scan 118. The indication may further note the specific type of virus or macro identified as associated with the data file 106. The indication may be transmitted to the event store 126, stored in the first database 114, or if stored as metadata of the data file 106, the metadata of the data file 106 may be separated from the data file 106 and stored in the second database 122, while the remaining portions of the data file 106 such as the payload, are prevented from being uploaded to the second database 122.

FIG. 5 illustrates a flow chart for a method 500 of for a system for file management and monitoring according to one embodiment. Other examples may include more operations, fewer operations, different operations, or a different order of the operations shown in FIG. 5. The operations of FIG. 5 will now be described below with reference to the components of FIG. 1.

At step 501, the review service 128 receives a request to output the event history of a data file 106. The request may be initiated by a user 102 input through a user interface 104. The user 102 initiating the request to review the event history of the data file may be a different user compared to the user who originally initiated the upload request At step 502, the review service 128 retrieves the event history from a data store. The data store storing the event history can be the event store 126. The event store 126 may be capable of storing the event history of each data file 106 upload request initiated by any user with access to the upload service 112.

At step 503, the review service 128 outputs the event history. The review service 128 can output the event history of the data file 106 through the user interface 104. The user interface may be the same interface used by both the review service 129 and the upload service 112.

FIG. 6 illustrates a flow chart for a method of for a system for file upload, management, and monitoring according to one embodiment. Other examples may include more operations, fewer operations, different operations, or a different order of the operations shown in FIG. 6. The operations of FIG. 6 will now be described below with reference to the components of FIG. 1. Steps 601-604 may represent a data file staging process, wherein a data file 106 may be uploaded to a second database, wherein a file location is reserved for the data file 106. A user may perform the data file staging steps prior to fully committing the data file for more permanent storage of the data file in the second database. Instead, steps 605-607 may be additionally performed as part of a data file ingestion process for more permanent storage of the data file 106.

At step 601, the upload service 112 requests access to a file location for storage of a data file 106. The file location for storage of the data file 106 can be a network attached storage (NAS) location. The request may be initiated by an API call, and the process of uploading the data file to the second database 122 and receiving a request ID may be referred to as staging the file for file upload.

At step 602, the upload service 112 receives a signed URL. The signed URL may be transmitted from the second database 122 to the upload service 112. The signed URL may be time limited, and access limited to provide only specified users 102 access to the NAS location linked by the signed URL. For instance, regulatory users may have access to one specific signed URL, whereas unregulated users may be provided a different signed URL. The signed URL may be uniquely generated by the second database 122 in response to each request initiated by the API Call per step 601. As with each other step, the second database 122 having sent the signed URL to the upload service 112 may be recorded as part of the event history of the specific data file 106 upload request.

At step 603, the upload service 112 uploads the data file 106 via the signed URL. Successful upload of the data file via the signed URL may be indicated with a return message such as an HTTP 200, 201, or 202 message indicating successful reception, storage, and/or processing of the data file 106. Alternatively, return HTTP messages 400, 401, or 403 may be returned by the second database indicating failed reception of the data file 106. Regardless of the message received, each message may be stored as part of the event history of the data file 106 and stored in the event store.

At step 604, the upload service 112 receives a request ID associated with the data file 106. The request ID may indicate that the data file 106 has successfully reached the NAS location within the second database. Upon reception of the request ID, a staging process of the data file 106 is complete. In some examples, completion of the staging process indicates that the data file 106 is temporarily stored at a NAS location within the second database 122 but will be deleted absent additional ingestion steps described with respect to steps 605-607. For instance, absent additional steps 605-607, the upload service 112 may be configured to delete the data file 106 from the NAS location after 7 days since the initial upload to the second database 122.

At step 605, the upload service 112 transmits the data file and the request ID associated with the data file to a data ingestion application. The data ingestion application may be a service such as Apache Kafka, Java Database Connectivity, or Hadoop. The data ingestion application may then provide for more permanent storage of the data file 106 within the second database 122.

At step 606, the upload service 112 receives, from the data ingestion application, a document ID associated with the data file 106. The document ID associated with the data file may be generated by the data ingestion application and used to download the data file 106 from the second database 122. Multiple document IDs may be associated with any one data file 106.

At step 607, the upload service 112 stores the document ID associated with the data file as a component of the event history of the data file 106. The document ID may be stored as metadata appended to the data file 106 to be stored in the event store 126.

Example Computing System for Implementing the Upload Service Application

Figure 7:
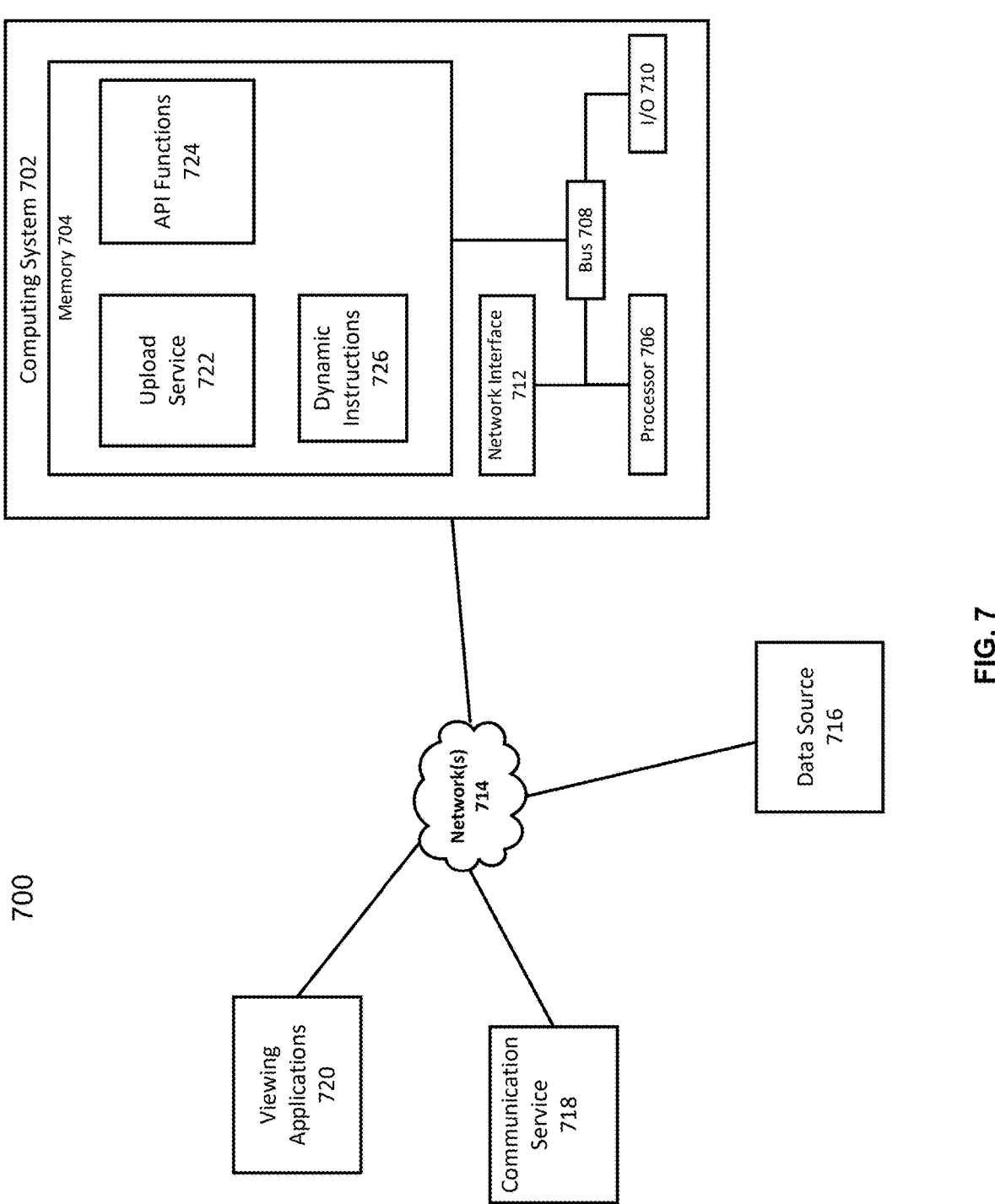
FIG. 7 illustrates a block diagram for an example computing environment capable of executing the described systems and methods according to one embodiment.

Any suitable computing system or group of computing systems can be used for performing the operations described herein. For example, FIG. 7 illustrates a block diagram for an example computing environment capable of executing the described systems and methods, according to certain embodiments.

The depicted example of a computing system 72 includes one or more processors 706 communicatively coupled to one or more memory devices 704. The processor 706 executes computer-executable program code or accesses information stored in the memory device 704. Examples of processor 706 include a microprocessor, an application-specific integrated circuit ("ASIC"), a field-programmable gate array ("FPGA"), or other suitable processing device. The processor 706 can include any number of processing devices, including one.

The memory device 704 includes any suitable non-transitory computer readable medium for storing the upload service 722, API Code 728 and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 702 may also include a number of external or internal devices such as input or output devices. For example, the computing system 702 is shown with an input/output ("I/O") interface 708 that can receive input from input devices or provide output to output devices. A bus 708 can also be included in the computing system 702. The bus 708 can communicatively couple one or more components of the computing system 702.

The computing system 702 executes program code that configures the processor 706 to perform one or more of the operations described above with respect to FIGS. 1-8. The program code includes operations related to, for example, receiving message calls from a messaging client, generating or modifying custom templates, and processing message client inputs into the template, or other suitable applications or memory structures that perform one or more operations described herein. The program code may be resident in the memory device 704 or any suitable non-transitory computer-readable medium and may be executed by the processor 706 or any other suitable processor. In some embodiments, the program code described above, the upload service 722, the API functions 724, dynamic instructions 726, and other received or determined values or data objects are stored in the memory device 704, as depicted in FIG. 7. In additional or alternative embodiments, one or more of the upload service 722, API functions 724, dynamic instructions 726, and other received or determined values or data objects and the program code described above are stored in one or more memory devices accessible via a data network, such as a memory device accessible via a cloud service.

The computing system 702 depicted in FIG. 7 also includes at least one network interface 712. The network interface 712 includes any device or group of devices suitable for establishing a wired or wireless data connection to one or more data networks 714 such as viewing applications 720 including user interfaces. Non-limiting examples of the network interface 712 include an Ethernet network adapter, a modem, and/or the like. A remote communication service 718 is connected to the computing system 702 via network 712 and can perform some of the operations described herein including generating templates or receiving messaging data and applying the messaging data to a specified template. The computing system 702 is able to communicate with one or more of the remote communication service 718 and the upload service 722 using the network interface 710. Although FIG. 7 depicts the upload service 722 as connected to computing system 702 via the networks 712, other embodiments are possible, including the upload service 722 running as a program in the memory 704 of computing system 702.

Advantages of Systems and Methods for Large File Upload

The described systems and methods provide benefits and improvements to the technical field of file upload and transmission. Current file database transmission systems and APIs are limited by file size, rendering the upload process for large files slow, difficult, if not impossible. Moreover, traditional file upload systems are not fault tolerant. If an upload fails downstream, it may be difficult to determine the point of failure in file upload, and what part of the file is corrupted. The described file upload system can improve the field of file upload and transmission by providing an interface for uploading files in spite of traditional upload systems being unable to process file exceeding a given file size. As examples, chunking of data files into data chunks for parallel transmission of the data file chunks to a database provides improvement to the speed and capabilities of file uploading. Detection of failed chunks, and failed file uploads as recorded as an event history of the data file provides for more efficient fine tuning and tracking of data transmission across databases.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method comprising:
   receiving a data file comprising metadata associated with a user;
   uploading the data file to a first database within a distributed computing environment via operations comprising;
      chunking the data file into two or more data chunks;
      transmitting in parallel and according to a scheduled batch transmission, each data chunk of the two or more data chunks via one or more nodes of a node network to a receiver at the first database;
   identifying an entitlement associated with the user based in part on the metadata;
   uploading the data file to a second database;
   determining, based in part on the entitlement associated with the user, a notification protocol;
   generating one or more notifications based on the notification protocol;
   determining an event history of the data file; and
   storing the event history.

2. The method of claim 1, wherein
the receiver is configured to:
    receive the two or more data chunks; and
    recombine the two or more data chunks in sequential
      order.

3. The method of claim 2 further comprising:
determining a failed data chunk of the two or more data
    chunks that was not received at the first database; and
retransmitting to the first database the failed data chunk.

4. The method of claim 1, wherein uploading the data file
to the first database comprises streaming the data file to the
first database.

5. The method of claim 1, wherein the second database is
selected based in part on the entitlement associated with the
user.

6. The method of claim 1, further comprising:
receiving a request to output the event history of the data
    file;
retrieving the event history from a data store; and
outputting the event history.

7. The method of claim 1, wherein the event history is
stored in a third database, separate from the first database
and the second database.

8. The method of claim 1, further comprising, prior to
uploading the data file to the second database:
    scanning, based on vulnerability data, the data file for one
      or more viruses;
    scanning, based on macro data, the data file for one or
      macros; and
    in response to identifying a virus associated with the data
      file or a macro associated with the data file, storing as
      a component of the event history of the data file, an
      indication that the method was terminated and termi-
      nating the method prior to uploading the data file to the
      second database.

9. The method of claim 1, wherein uploading the data file
from the first database to the second database comprises:
    requesting access to a file location for storage of the data
      file;
    receiving a signed URL;
    uploading the data file via the signed URL; and
    receiving a request ID associated with the data file.

10. The method of claim 9, further comprising:
transmitting the data file and the request ID associated
    with the data file to a data ingestion application;
receiving, from the data ingestion application, a document
    ID associated with the data file; and
storing the document ID associated with the data file as a
    component of the event history of the data file.

11. A system comprising:
one or more processors configured to:
    receive a data file comprising metadata associated with
      a user;
    upload the data file to a first database within a distributed
      computing environment via operations comprising;
      chunking the data file into two or more data chunks;
      transmitting in parallel and according to a scheduled
        batch transmission, each data chunk of the two or
        more data chunks via one or more nodes of a node
        network to a receiver at the first database;
    identify an entitlement associated with the user based in
      part on the metadata;
    upload the data file to a second database;
    determine, based in part on the entitlement associated
      with the user, a notification protocol;
    generate one or more notifications based on the notifica-
      tion protocol;
    determine an event history of the data file; and
    store the event history.

12. The system of claim 11, wherein
the receiver is configured to:
    receive the two or more data chunks; and
    recombine the two or more data chunks in sequential
      order.

13. The system of claim 12, wherein the receiver is further
configured to
    determine a failed data chunk of the two or more data
      chunks that was not received at the first database; and
    request retransmission of the failed data chunk.

14. The system of claim 11, wherein uploading the data
file to the first database comprises streaming the data file to
the first database.

15. The system of claim 11, wherein the second database
is selected based in part on the entitlement associated with
the user.

16. The system of claim 11, wherein the one or more
processors are further configured to:
    receive a request to output the event history of the data
      file;
    retrieve the event history from a data store; and
    output the event history.

17. The system of claim 11, wherein the event history is
stored in a third database, separate from the first database
and the second database.

18. The system of claim 11, wherein the one or more
processors are further configured to, prior to uploading the
data file to the second database:
    scan, based on vulnerability data, the data file for one or
      more viruses;
    scan, based on macro data, the data file for one or
      macros; and
    in response to identifying a virus associated with the
      data file or a macro associated with the data file:
      store, as a component of the event history of the data
      file, an indication that the one or more processors has
      not uploaded the data file;
    and terminate the upload prior to uploading the data file
      to the second database.

19. The system of claim 11, wherein uploading the data
file from the first database to the second database comprises:
    requesting access to a file location for storage of the data
      file;
    receiving a signed URL;
    uploading the data file via the signed URL; and
    receiving a request ID associated with the data file.

20. A non-transitory computer readable medium compris-
ing instructions that when executed by one or more proces-
sors cause the one or more processors to:
    receive a data file comprising metadata associated with a
      user;
    upload the data file to a first database within a distributed
      computing environment via operations comprising;
      chunking the data file into two or more data chunks;
      transmitting in parallel and according to a scheduled
        batch transmission, each data chunk of the two or
        more data chunks via one or more nodes of a node
        network to a receiver at the first database;
    identify an entitlement associated with the user based in
      part on the metadata;
    upload the data file to a second database;
    determine, based in part on the entitlement associated
      with the user, a notification protocol;
    generate one or more notifications based on the notifica-
      tion protocol;
    determine an event history of the data file; and
    store the event history.

* * * * *